United States Patent [19]
Zimmerman

[11] Patent Number: 5,816,848
[45] Date of Patent: Oct. 6, 1998

[54] AUXILIARY ELECTRICAL OUTLET

[76] Inventor: Harry Zimmerman, 310 Comstock Ave., Los Angeles, Calif. 90024

[21] Appl. No.: 691,011

[22] Filed: Aug. 5, 1996

[51] Int. Cl.⁶ ................................................... H01R 11/00
[52] U.S. Cl. ......................... 439/502; 439/640; 439/371; 174/69; 191/12 R
[58] Field of Search ................................. 439/501, 502, 439/373, 32, 162, 216, 640, 371; 24/129 B, 129 R–131 C, 115 A, 115 R; 248/51, 65, 70, 222.41, 221.12, 74.1; 174/DIG. 9, 69; 191/12 R

[56] References Cited

U.S. PATENT DOCUMENTS

| | | | |
|---|---|---|---|
| 2,133,985 | 10/1938 | Green | 439/162 |
| 2,362,481 | 11/1944 | Hartmann | 439/32 |
| 2,607,863 | 8/1952 | MacFarland | 174/69 |
| 3,731,956 | 5/1973 | Hanley | 248/221.12 |
| 5,143,331 | 9/1992 | Robert | 248/222.41 |
| 5,271,975 | 12/1993 | Solano | 439/932 |

*Primary Examiner*—Neil Abrams
*Assistant Examiner*—Katrina Davis
*Attorney, Agent, or Firm*—Elliott N. Kramsky

[57] ABSTRACT

An arrangement is provided for relocating a wall-mounted electrical outlet. A flexible electrical cord is mounted in a resilient, extensible housing between male and female connectors. The cord is gathered into an appropriate configuration to be extensible upon application of an axial tension force. A two-piece restrictor is slidable along and surrounds the cord in its open position or configuration. In its closed configuration, the restrictor pinches or crimps the cord to prevent transmission of remote tension force to a fixed electrical outlet. A slot in the female connector is arranged to engage an elongated member, such as a screw, protruding from the wall to hold the female connector at a predetermined position along a wall remote from a fixed outlet.

17 Claims, 2 Drawing Sheets

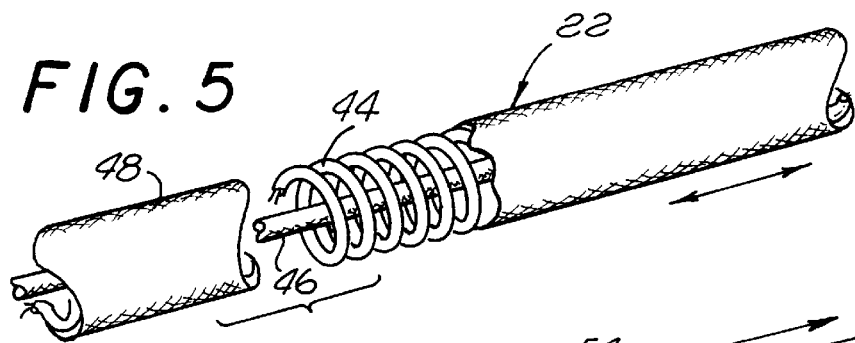
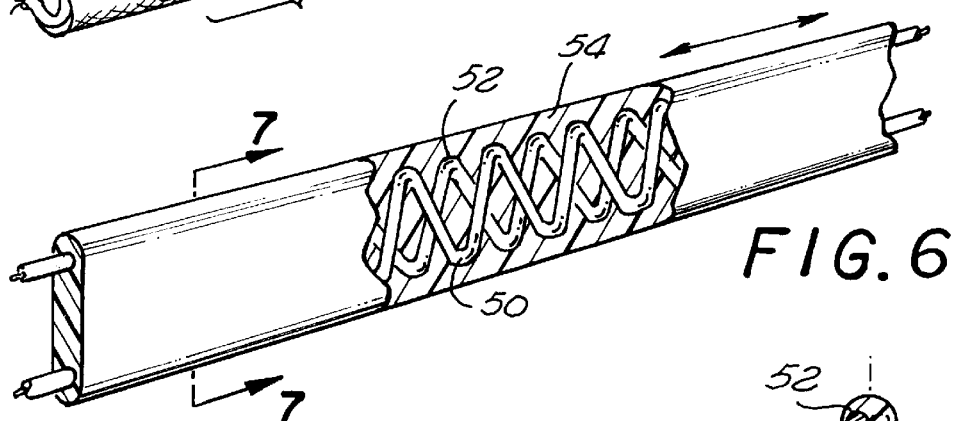
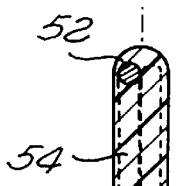
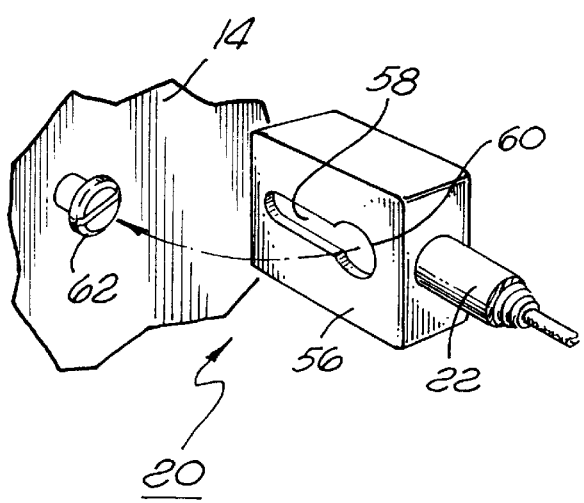
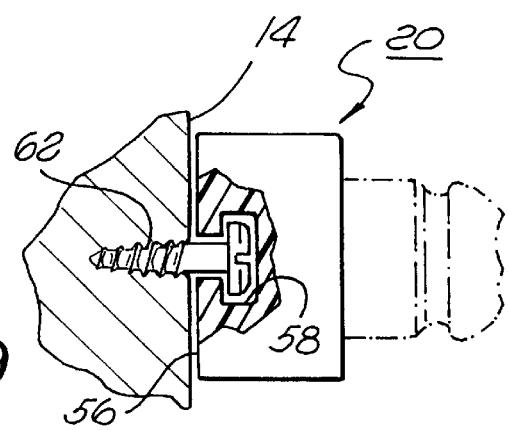

AUXILIARY ELECTRICAL OUTLET

BACKGROUND

1. Field of the Invention

The present invention relates to electrical outlets. More particularly, this invention pertains to an adapter for selectively positioning an outlet.

2. Description of the Prior Art

There exists a ubiquitous need for extension cords in both home and office settings. This arises in large measure from limitations imposed by the number and positioning of wall outlets. Such outlets are generally fixed at the time of construction. In many instances, they will turn out to be located behind furniture or in other relatively-inaccessible positions.

The frequently inadequate lengths of appliance conductors coupled with the often-inconvenient locations and inadequate numbers of a.c. wall outlets quite often requires the use of extension cords in which insulated conductors terminate, at one end, in a male plug connector and, at the other end, in a female plug connector. In use, the female connector is mated with the male connector of an appliance and the male connector of the extension cord inserted, either directly or through an adapter, into the wall outlet.

Extension cords come in a number of standard lengths. Unfortunately, the range of possible distances between an appliance and a wall outlet is infinite. This generally forces one to "make do" with an extension cord of excessive length. As a result, an often-unseemly tangle of electrical cord is created on the floor. Such an excess length of electrical cord can be dangerous. By becoming entangled with one's feet, tripping accidents can result in injury. Also, a snagged cord can cause an appliance to be knocked over, breaking it or possibly igniting a fire.

SUMMARY OF THE INVENTION

The preceding and other disadvantages of the prior art are addressed by the present invention that provides, in a first aspect, an auxiliary electrical outlet. Such outlet includes a flexible, elongated member. The member is extensible and includes a plurality of electrical conductors. A female connector for receiving a male plug of an electrically energizable apparatus is in conductive connection with the conductors at one end of the member and a male connector for being received by a fixed wall outlet is in conductive connection with such conductors at the other end of said member.

Means are provided for exerting a reactive spring force in response to the application of axial tensioning to the elongated member. Means are also provided for isolating a segment of the member adjacent the male connector from such tensioning. Means are additionally provided for securing the female connector to a wall.

In a second aspect, the invention provides an extension cord. The extension cord includes an extensible, elongated member that includes a plurality of electrical conductors. A female connector is fixed to one end of the member and a male connector is fixed to the other end. Each of such connectors is in conductive communication with the plurality of electrical condotors. Such member includes means for exerting a reactive spring force in response to axial tension.

The preceding and other features and advantages of the present invention will become further apparent from the detailed description that follows. Such detailed description is accompanied by a set of drawing figures. Numerals of the drawing figures, corresponding to those of the written description, point to the various features of the invention. Like numerals refer to like features throughout both the written description and the drawing figures.

BRIEF DESCRIPTION OF THE DRAWINGS

FIG. 5 is an exploded perspective view of a first embodiment of the extension cord of the invention wherein an insulted electrical conductor is coiled about a bungee cord;

FIG. 6 is a perspective view of an alternative embodiment of the extension cord of the connector in which concertinaed electrical conductors are encapsulated within resilient elastomeric material;

FIG. 7 is a cross-sectional view of the extension cord of the alternative embodiment taken at line 7—7 of FIG. 6;

FIG. 8 is a detailed perspective view for illustrating the means for mounting the female connector of the extension cord; and FIG. 9 is a cross-sectional view of the female connector engaged to a wall in accordance with the invention taken at line 9—9 of FIG. 1.

DETAILED DESCRIPTION OF THE PREFERRED EMBODIMENT

Figure 1:
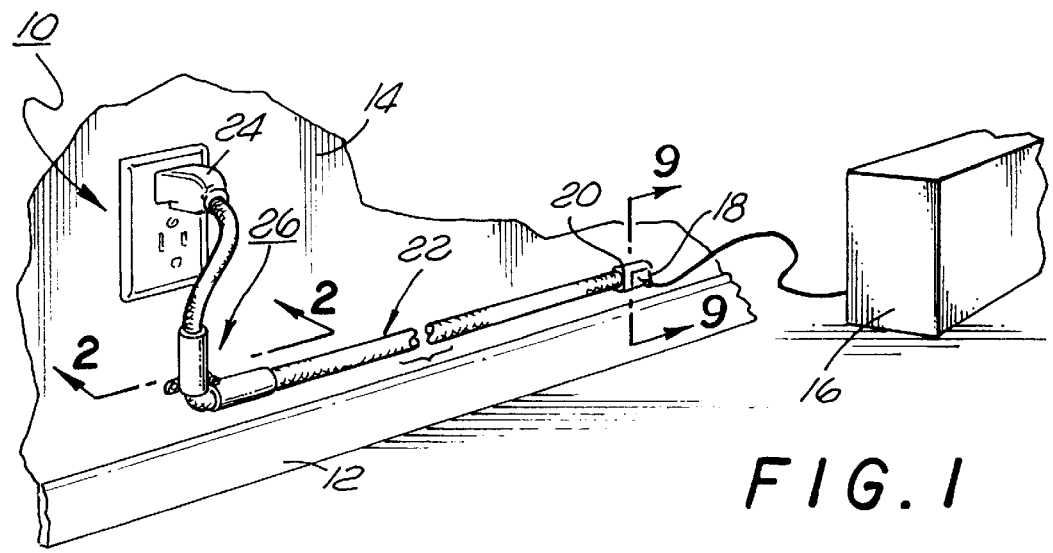
FIG. 1 is a partially-broken perspective view of the invention as mounted for use.

Turning now to the drawings, FIG. 1 is a partially-broken perspective view of the invention as mounted for use. The invention provides an auxiliary electrical outlet for use in conjunction with a fixed outlet 10. The fixed outlet 10 is normally located near the baseboard 12 at the bottom of a wall 14. As has been discussed above, the number and location of a fixed wall outlet 10 is often inadequate for conveniently reaching an electrically-energizable apparatus or appliance 16. The invention effectively "relocates" the fixed wall plug 10 to a remote position whereby the male plug 18 connector of the appliance (or of a connected extension cord) can conveniently reach the auxiliary electrical outlet at a female connector 20.

As will be discussed below, the auxiliary electrical outlet of the invention comprises a cooporative arrangement that includes, in addition to the female connector 20, an extension cord 22 of resilient character including a male plug 24 and a two-piece restrictor 26 which is slidable along the extension cord 22 in an "open" position. In its "closed" position, as shown in FIG. 1, the restrictor 26 isolates the connection between the male connector 24 and the fixed wall outlet 10 from tension.

Figure 2:
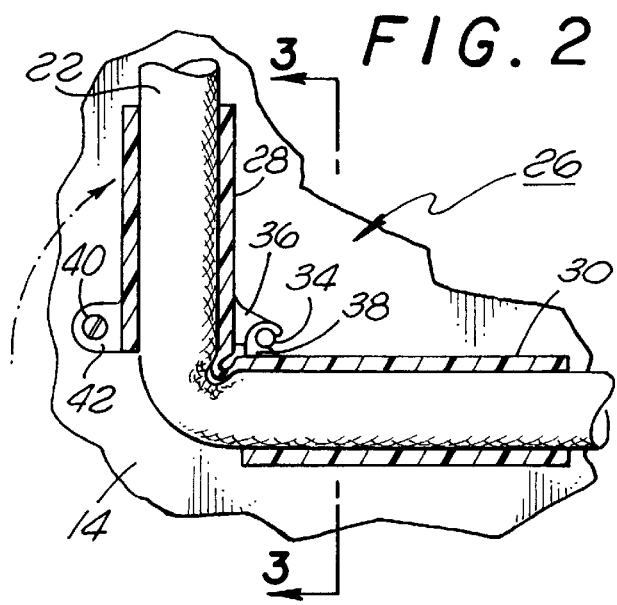
FIG. 2 is a cross-sectional view of the restrictor of the invention in the closed position taken at line 2—2 of FIG. 1.

FIG. 2 is a cross-sectional view of the restrictor 26 of the invention in the closed position or configuration taken at line 2—2 of FIG. 1. As mentioned above, the restrictor 26 comprises a two-part element comprising a first hollow cylindrical section 28 that is joined to a second hollow cylindrical section 30 by means of a live hinge 32. The hinge 32 may comprise a reduced thickness section that is formed with the first and second hollow cylindrical sections 28 and 30, respectively. The sections 28, 30 and the hinge 32 may be formed of resilient elastomeric material with the greater thicknesses of the sections 28 and 30 providing substantially rigid structures vis a vis the reduced-thickness hinge 32.

As can be seen, the hinge 32 is arranged to protrude inwardly upon flexure to the closed configuration of the restrictor 26 as shown in FIG. 2. Upon closure, the protruding material of the hinge 32 effectively pinches into the extensible cord 22. This prevents the transmission of axial tension along the complete length of the extensible cord 22. Referring back to FIG. 1, it is to be noted that, in operation, the restrictor 26, which surrounds the extensible cord 22, is preferably located beneath the wall outlet 10. An appropriate length of the extensible cord 22 is provided above the restrictor 26 so that the connection between the male connector 24 and the wall outlet 10 is free of tension force that might otherwise disconnect the connector 24.

Figure 3:
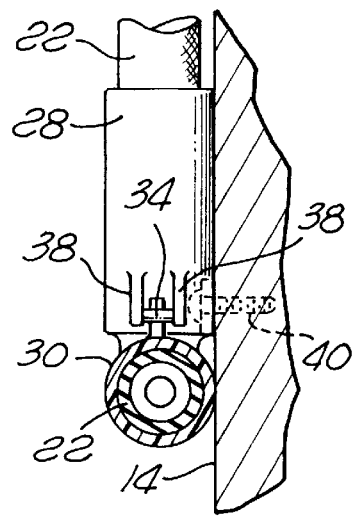
FIG. 3 is a cross-sectional view of the restrictor and extension cord of the invention taken at line 3—3 of FIG. 2.
Figure 4:
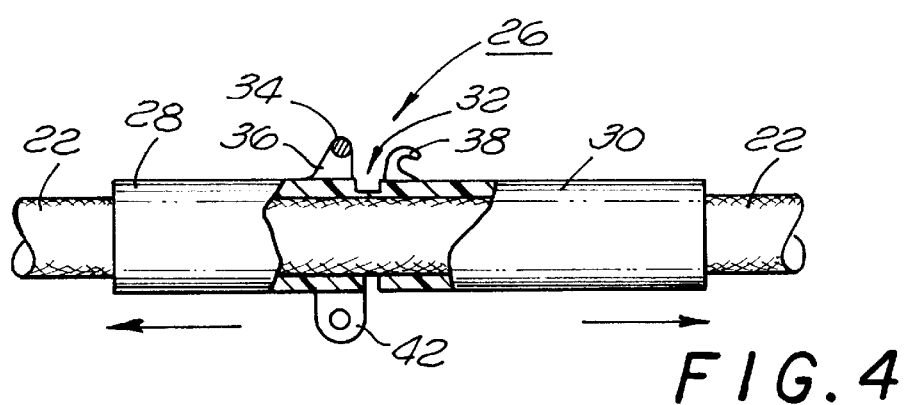
FIG. 4 is a side elevation view of the restrictor and extension cord of the invention in the open position with portions removed for purposes of clarity.

The restrictor 26 is fixed in the closed position of FIG. 2 by the interlocking of, a stub 34, fixed to a flange 36 that, in turn, is fixed to the first section 28, with a paired hook 38 that is fixed to the second section 30. The closed restrictor 26 is fixed to the wall by means of a screw or like fastener 40 at a flange 42 of the first section 28. The closed configuration is further illustrated in detail in FIG. 3, a cross-sectional view of the restrictor 26 and extensible cord 22 of the invention in the closed position taken at line 3—3 of FIG. 2. In contrast, FIG. 4 is a side-sectional view of the restrictor 26 and extensible cord 22 in the open position whereby the first and second sections 28 and 30 respectively are substantially axially aligned. In such position, the live hinge 32 no longer protrudes within the interior of the restrictor 26. As the extensible cord 22 is not pinched in the open configuration, the restrictor 26 is free to travel along the extensible cord 22. This allows one to correctly position the restrictor 22 prior to affixation to the wall 14.

Turning to FIG. 1, once the restrictor 26 has been fixed to the wall 14 in the closed position, one may extend or stretch the segment of the cord 22 that lies beyond the restrictor 26 and terminates at the female connector 22 without transference of the resultant axial tension to the portion of the cord 22 that lies at the other side of the restrictor 26. This, as mentioned earlier, isolates the junction between the male connector 24 and the wall plug 10 from dislodging axial tension forces.

FIGS. 5 through 7 illustrate various configurations of an extensible cord 22 for use in the invention. FIG. 5 is an exploded perspective view of an embodiment of the extensible cord 22 based upon the "bungee cord" concept. An electrical cord 44 comprising two or more conductors surrounded by appropriate insulation, such as rubber, is coiled about an elasticized central cord 46 within an outer housing 48 of resilient material. Upon the application of axial force at the female connector 20, the extensible cord lengthens by a responsive amount. The central cord 46 and the housing 44, both fabricated of resilient, preferably elastomeric or rubberized material, will respond in length to the axial force applied while the coiled electrical conductor 44, including ample excess conductor length, will shift to a lesser-coiled configuration. In the extended-length configuration, the cord of FIG. 5 stores energy in the form of an axial spring force that, as mentioned earlier, is not transmitted beyond the restrictor 26. The magnitude of such spring force is dependent upon the spring constant and degree of extension of the materials of the central cord 46 and the housing 45.

FIGS. 6 and 7 are elevation and cross-sectional views of an alternative embodiment of the extensible cord for use in the invention. As shown, electrical conductors 50 and 52 (note: either embodiment of the extensible cord may comprise either a two or three conductor arrangement) are gathered in a compressed configuration within a resilient, preferably elastomeric or rubberized encapsulation 54. As shown, the electrical conductors 50 and 52 are arranged into a concertinaed shape that is subject to accordion-like extension without breakage in response to the application of axial tension. Again, the restrictor 26 prevents transmission of the energy stored by the stretched extensible cord while the spring constant and the degree of extension of the encapsulating material 54 determine the magnitude of the reactive spring force.

FIG. 8 is a detailed perspective view of the arrangement for mounting the female connector 20 to the wall 14. A side 56 of the female connector 20 has an internal, lengthwise slot 58 that terminates at one end in a circular key 60 for receiving an elongated member 62 which is mounted within the wall 14. The elongated member 62 (preferably a screw or a nail) protrudes a bit therefrom in a direction transverse to the surface of the wall 14.

The female connector 20 is fixed to a predetermined position with respect to the wall 14 by affixing the elongated member 62 adjacent the desired position of the auxiliary outlet. The female connector 20 is secured to the wall at the desired location by applying a tension force to stretch the extensible cord 22 to the appropriate location and then slipping the connector 20 over the elongated member 62 so that the key 60 at the head of the slot 58 engages the elongated member 62. The female connector is then pressed against the wall and released so that the tension within the extensible member 22 holds the female connector 20 to the elongated member 62, fixing it to the wall 14 with the elongated member 62 latching the female connector 20 at the opposed end of the elongated slot 58. The stable or locked position of the female connector 20 with respect to the wall 14 whereby the elongated member 62 resides within the elongated slot 58 is shown in FIG. 9, a cross-section view taken at line 9—9 of FIG. 1.

Thus, it is seen that the present invention provides an auxiliary wall outlet for overcoming the inconvenience often associated with the use of fixed wall outlets. By employing the teachings of the invention, one may readily relocate the position of an otherwise-inconvenient wall outlet so that the need for excessive and dangerous lengths of loose extension cord is minimized. The device, by employing an extensible cord, provides a neat appearance that may be further enhanced by employing a cowling or other covering structure. The entire structure may be painted to further minimize evidence of wall outlet relocation. In addition, by inserting a multiple plug adapter at the wall outlet 10, the invention maybe employed to increase the number of usable outlets within a room.

While this invention has been described with reference to its presently preferred embodiment, it is not limited thereto. Rather, this invention is limited only insofar as it is described by the following set of patent claims and includes within its scope all equivalents thereof.

What is claimed is:

1. An auxiliary electrical outlet comprising, in combination:
   a) a flexible, elongated member;
   b) said member being extensible and comprising a plurality of electrical conductors;
   c) a female connector for receiving a male plug of an electrically energizable apparatus in conductive connection with said conductors at one end of said member and a male conductor for being received by a fixed wall outlet in conductive connection with said conductors at the other end of said member;

d) said elongated member including means for exerting a reactive spring force in response to the application of axial tensioning to said elongated member;

e) means for isolating a segment of said member adjacent said male connector from said tensioning; and f) means for securing said female connector to a wall.

2. An outlet as defined in claim 1 wherein said means for isolating further includes:

a) a hollow, generally cylindrical member; and b) said member surrounding, and being of lesser length than, said flexible elongated member.

3. An outlet as defined in claim 2 wherein said hollow, generally cylindrical member further includes;

a) a first hollow cylindrical section;

b) a second hollow cylindrical section; and c) means for engaging said first section to said second section.

4. An outlet as defined in claim 3 wherein said means for engaging comprises a hinge.

5. An outlet as defined in claim 4 wherein:

a) said generally cylindrical member is movable between an open position and said closed position about said hinge;

b) said first and second sections are substantially axially aligned in said open position; and c) said first and second sections are substantially perpendicularly aligned in said closed position.

6. An outlet as defined in claim 5 further comprising:

a) said hinge is a live hinge; and b) said hinge is arranged to extend into the interior of said hollow cylindrical member when said member is in said closed position.

7. An outlet as defined in claim 6 further including means for fixing said generally cylindrical member in said closed position.

8. An outlet as defined in claim 7 wherein said means for fixing further comprises:

a) a stub fixed to said first section; and b) a hook fixed to said second section and arranged to cooperatively engage said stub.

9. An outlet as defined in claim 8 further including means for fixing said second section to said wall.

10. An outlet as defined in claim 5 wherein said hollow, generally cylindrical member is fabricated of resilient plastic material.

11. An outlet as defined in claim 1 wherein said means for exerting a reactive spring force further comprises:

a) a generally cylindrical housing of resilient material; and b) said elongated member being gathered in a compressed arrangement within said housing.

12. An outlet as defined in claim 11 wherein said means for exerting a reactive spring force further includes:

a) an extensible cord of resilient material arranged along the axis of said housing; and b) said elongated member being coiled about said extensible cord.

13. An outlet as defined in claim 1 wherein said means for exerting a reactive spring force further comprises:

a) said elongated member comprising a compressed arrangement; and b) said elongated member being encapsulated within resilient elastomeric material.

14. An outlet as defined in claim 13 wherein said elongated member is in a concertinaed configuration within said encapsulation.

15. An outlet as defined in claim 1 wherein said means for securing said female plug further comprises:

a) an elongated member, said member being fixed transverse to the surface of said wall; and b) said female plug having a lengthwise slot for engaging said elongated member.

16. An extension cord comprising, in combination:

a) an extensible elongated member including a plurality of electrical conductors;

b) a female connector fixed to one end of said member and a male connector being fixed to the other end of said member, each of said connectors being in conductive communication with said plurality of electrical conductors;

c) said member including means for exerting a reactive spring force in response to axial tension; and d) said means for exerting a reactive spring force including (i) a generally-cylindrical housing of resilient material, (ii) an extensible cord of resilient material arranged along the axis of said housing, and (iii) said elongated member being coiled about said extensible cord.

17. An extension cord as defined in claim 16 wherein said means for exerting a reactive spring force further comprises:

a) said elongated member being in a concertinaed configuration; and b) said elongated member being encapsulated in resilient elastomeric material.

* * * * *